April 16, 1935. L. H. BOTTS 1,997,851
FRUIT PICKING TOOL
Filed Nov. 3, 1933 4 Sheets-Sheet 1
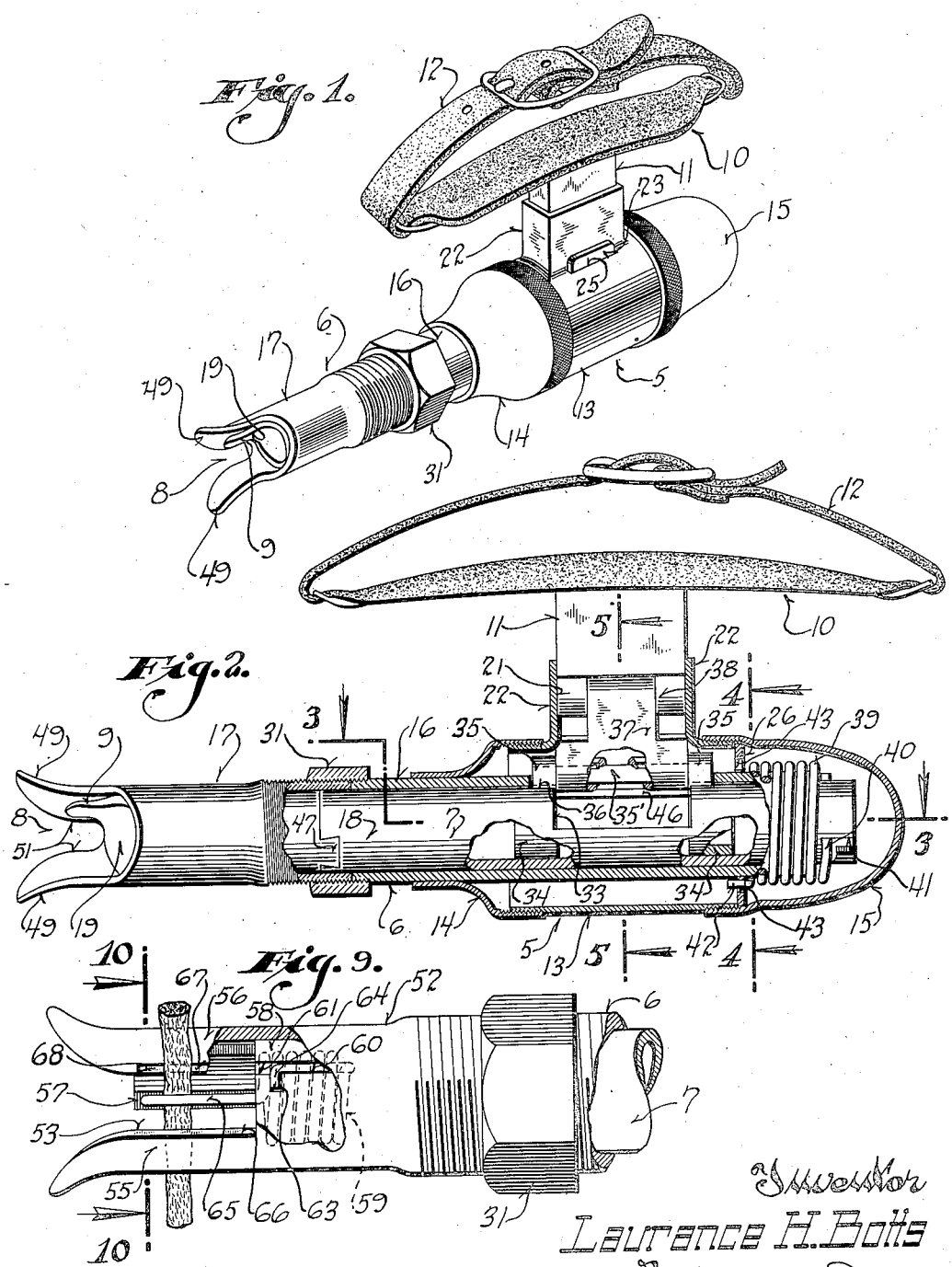

April 16, 1935.    L. H. BOTTS    1,997,851
FRUIT PICKING TOOL
Filed Nov. 3, 1933    4 Sheets-Sheet 2
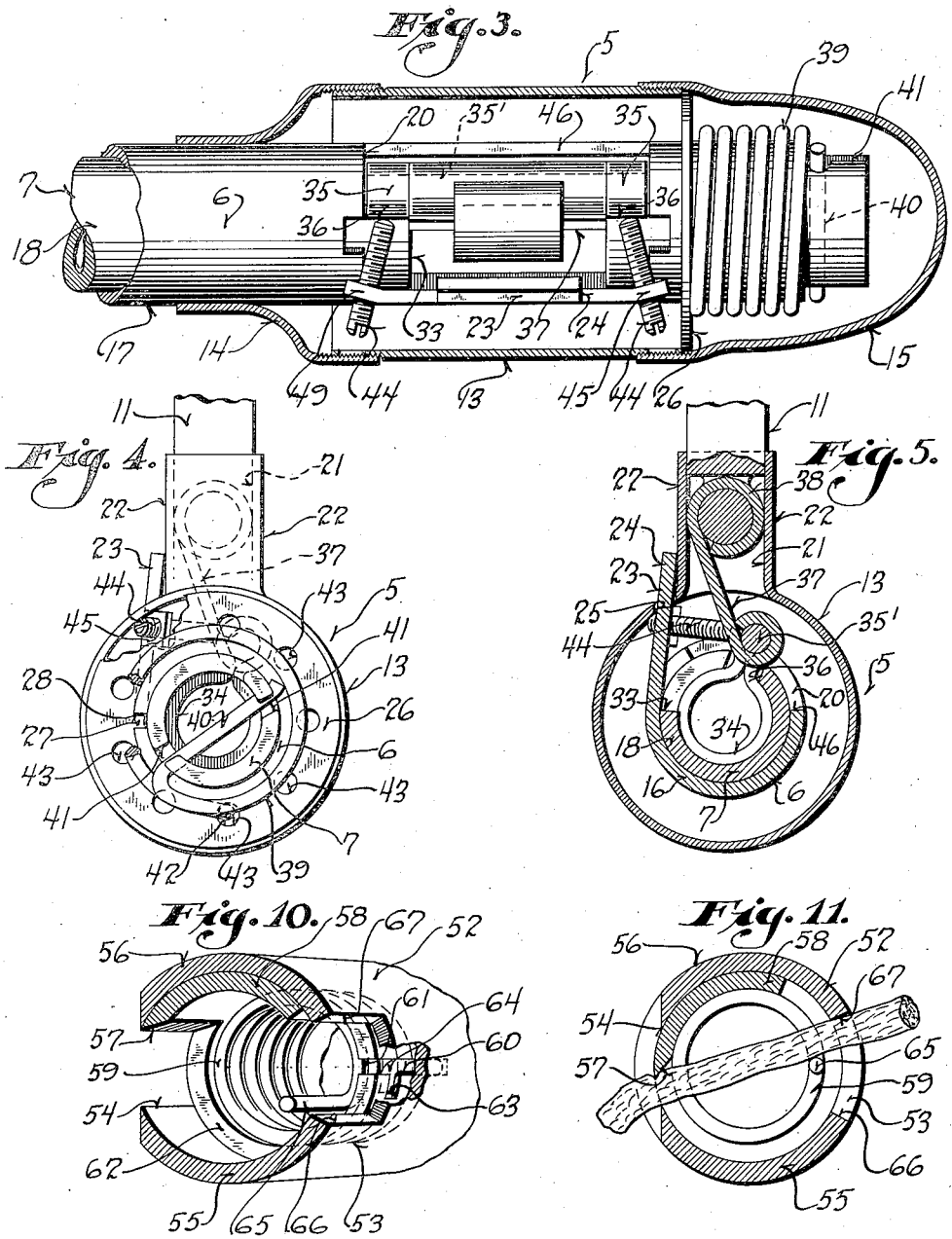

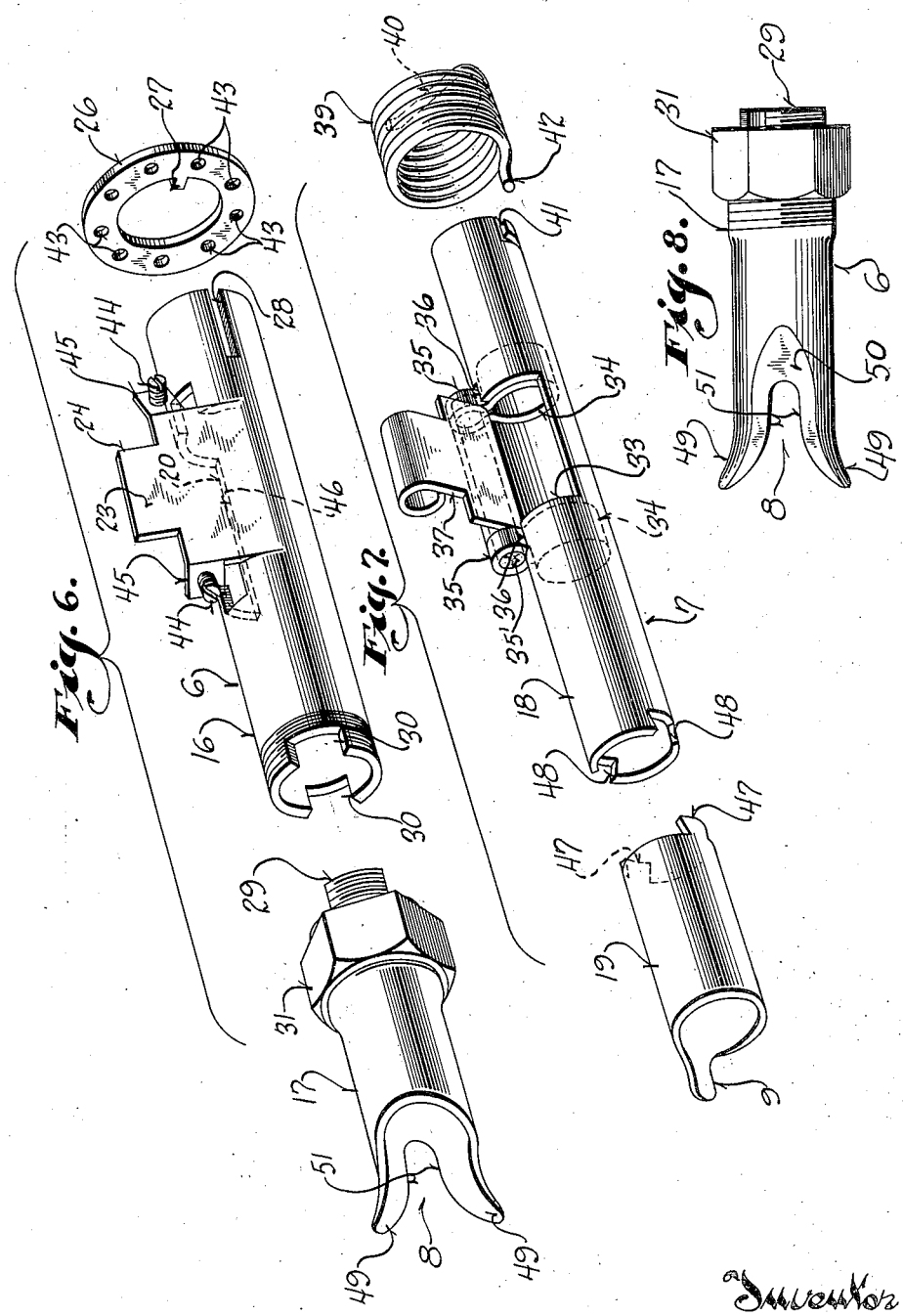

April 16, 1935.  L. H. BOTTS  1,997,851
FRUIT PICKING TOOL
Filed Nov. 3, 1933  4 Sheets-Sheet 4
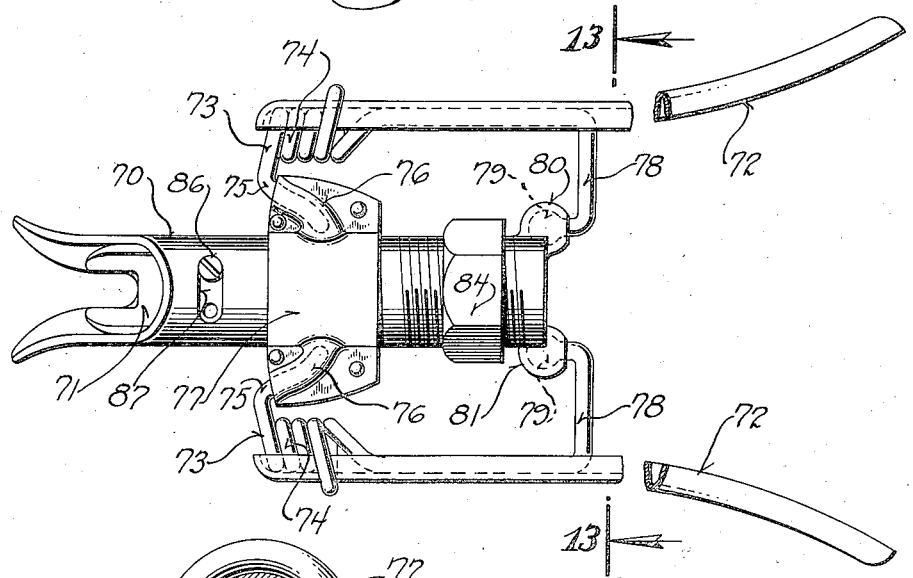
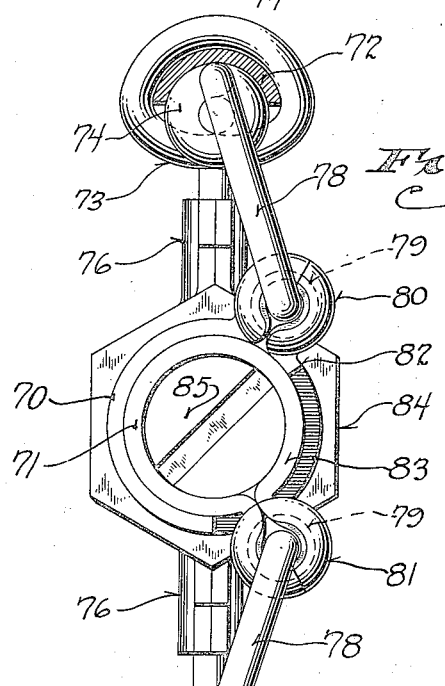
Inventor
Laurance H. Botts Patented Apr. 16, 1935

1,997,851

UNITED STATES PATENT OFFICE 1,997,851

FRUIT PICKING TOOL

Laurance H. Botts, De Land, Fla.

Application November 3, 1933, Serial No. 696,496

25 Claims. (Cl. 30—24)

This invention relates to certain new and useful improvements in fruit picking tools or clippers and has as a general object to provide a convenient, practical, and easily manipulated device for this purpose.

Another object of this invention is to provide a tool of the character described which is so constructed as to preclude injury to the fruit while at the same time permitting its stem to be cut directly adjacent the fruit.

Another object is to provide a tool of the character described wherein the cutting knife is protected against contact with the fruit.

It is also an object of this invention to provide a tool for picking fruit and particularly oranges and other citrous fruits wherein the stem must be severed close to the fruit in which means are provided for guiding the application of the tool onto the stem.

A further object of this invention is to provide a tool of the character described, which may be held and manipulated entirely by one hand.

A further object of this invention is to provide a fruit picking tool of the character described in which the cutting elements are in the form of telescoped relatively rotatable members.

Another object of this invention is to provide a tool of the character described wherein actuation of the rotatable cutting elements is effected by the compression of two handle members.

Another object of this invention is to provide a fruit picking tool having readily detachable cutter sections.

A further object of this invention is to provide means carried by the cutter section of the tool for supporting the fruit by its stem after it has been cut, thus making it possible to pick grapes and other long stemmed fruit with but one hand.

And a still further object of this invention is to provide a fruit picking device of the character described, in which the actuating elements are encased in a housing containing a lubricant.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated several complete examples of the physical embodiment of my invention constructed according to the best modes, I have so far devised for the practical application of the principles thereof, and in which:

Figure 1 is a perspective view of a fruit picking tool embodying one form of this invention;

Figure 2 is a side view thereof with parts broken away and in section;

Figure 3 is a longitudinal section view through Fig. 2 on the plane of the line 3—3;

Figure 4 is a cross section view taken through Fig. 2 on the plane of the line 4—4;

Figure 5 is a cross section view taken through Fig. 2 on the plane of the line 5—5;

Figure 6 is a perspective view of the stationary elements of the tool other than the outer casing, shown separated and in their proper order of assembly;

Figure 7 is a perspective view similar to Fig. 6 of the rotatable elements of the tool;

Figure 8 is a detail view illustrating the formation of the stationary cutter section;

Figure 9 is a detail view illustrating the cutter end of the tool modified to embody means for holding the fruit stem;

Figure 10 is a cross section view in perspective of the construction illustrated in Fig. 9, and taken on the plane of the line 10—10 of Fig. 9, with the parts in their open inactive positions;

Figure 11 is a direct section view through Fig. 9, also on the plane of the line 10—10, but illustrating the parts in their positions during the actual cutting operation;

Figure 12 is a side view of a slightly modified embodiment; and

Figure 13 is an enlarged section view taken through Fig. 12 on the plane of the line 13—13.

Referring now more particularly to the accompanying drawings in which like numerals indicate like parts throughout the several views, the numeral 5 designates a tubular housing in which a pair of cooperating telescoped outer and inner members 6 and 7, respectively, are mounted to project from one end of the housing.

The outer member 6, which is stationary with respect to the housing, has its outer end bifurcated to provide a stem slot 8 engageable over a fruit stem to be severed. The inner member 7 is rotatable in the member 6 and has a knife part 9 on its outer end to cooperate with one edge of the slot 8 to cut the stem upon rotation of the inner member 7. Rotation of the inner member 7 is effected by depressing a handle 10 toward the housing 5, the handle 10 having a part 11 projecting into the housing to actuate mechanism to be hereinafter described and impart the desired rotation to the inner member 7.

The handle 10 is of such size and is so located with respect to the housing 5 as to enable an operator to grasp both the handle and the housing in one hand so that a natural closing of the hand actuates the device to effect the desired cutting action. The tool illustrated is designed for operation with the right hand although the cutting elements may be readily reversed to permit left handed operation, as will be hereinafter more fully described.

To facilitate manipulation of the tool, a strap 12 is attached to the handle 10, which permits the device to be strapped to the fingers of the operator's hand.

In detail, the housing 5 comprises a cylinder 13 having a substantially conical collar 14 removably attached to one end, and a cap or hood 15 detachably secured to its other end to completely close said end of the housing. The inner diameter of the reduced end of the collar 14 is substantially equal to the outer diameter of the tubular member 6 to snugly receive the same.

For the detailed construction of the members 6 and 7, reference is particularly made to Figs. 6 and 7. As here shown, the outer member 6 comprises a mounting section 16 and a cutter or knife section 17. The inner rotatable member 7 is also sectional, having a driving section 18 and a cutter or knife section 19.

The mounting section 16 of the outer member 6 is in the form of a cylinder of sufficient length to have its inner end disposed within the hood or cap 15 and its outer end projected beyond the collar 14. The medial portion of the cylinder 16 has an opening 20 cut into its side. This opening is centered with respect to the length of the cylinder 13 which forms the body of the housing, and is aligned with the handle part 11.

The cylinder 13 has a rectangular opening 21 provided with an upstanding flange 22 entirely encircling the perimeter of the opening, and the handle part 11 is slidably received in the flanged opening to be connected, in a manner hereinafter described, with the driving section 18 of the rotatable member 7.

A flat wall 23 projects tangentially from one edge of the opening 20. Preferably, the wall 23 is formed by the metal cut from the cylinder in forming the opening 20, although if desired, a separate piece may be welded to the cylinder. The outer end of the wall 23 is reduced in width as at 24 and projects through a slot 25 in the cylinder 13 alongside one of the flanges 22. To enable assembly of the section 16 with the housing, the distance from the outermost extremity of the end 24 to the opposite portion of the cylinder per se, is less than the internal diameter of the cylinder 13 so that the section 16 may be inserted into the cylinder 13. Obviously, during this insertion, the collar 14 is detached from the cylinder 13 and likewise the cap 15 is removed.

After the end 24 of the wall 23 is projected through the opening 25, the collar 14 is attached to the cylinder 13 so as to hold the wall part 24 against dislodgment from its opening 25. A washer 26 disposed over the inner end of the cylindrical section 16 and engaging the inner wall of the cylinder 13, cooperates with the collar 14 to maintain the section 16 properly positioned in the housing.

For a purpose to be hereinafter described, the washer 26 is secured against rotation about the mounting section 16 by the engagement of a lug 27 on the washer with a slot 28 in the inner end of the section 16.

The cutter section 17 of the stationary outer member 6 is coupled to the outer end of the cylinder 16 as follows: Projecting from the inner end of the cutter section 17 are two diametrically opposite lugs 29 which are adapted to seat in correspondingly shaped and located recesses 30 formed in the outer end of the cylinder 16. The engagement of the lugs 29 in the recesses 30 holds the sections against relative rotation, and a nut 31 threadedly engaged with both sections retains the same against longitudinal separation. In this manner, the cutter section 17 is readily detachable from its mounting section 16 and is also readily reversible to enable the tool to be adapted for both right and left handed operation.

Referring now specifically to the inner rotatable member 7, the driving section 18 thereof is freely rotatably mounted within the cylinder 16. A medial portion of this driving section 18, which is in the form of a sleeve, has an opening 33 cut into its side in alignment with the opening 20 in the cylinder 16. Disposed within the sleeve 18 at opposite ends of its opening 33 are rings 34 to which loops 35 are secured. The loops 35 are received in recesses 36 cut into the sleeve 18 from the ends of the opening 33 so that the rings 34 are held against rotation in the sleeve with their loops 35 axially aligned.

A pin 35' passed through the loops 35 pivotally connects one end of a link 37 eccentrically to the sleeve. The link 37 is of a width substantially equal to the distance between the inner faces of the loops so that the rings 34 carrying the loops are held against dislodgement from the sleeve. The outer end of the link 37 is pivotally connected, as at 38, to the inner end of the handle member 11. As best seen in Fig. 5, the connection of the sleeve 18 with the handle member 11 by means of the link 37, causes the sleeve to be rotated upon depression of the handle.

Rotation imparted to the sleeve 18 by depression of the handle is yieldably resisted by a coiled spring 39 encircling the inner end of the cylinder 16. One end 40 of the coiled spring is extended diametrically across its diameter to be engaged in recesses 41 formed in diametrically opposite portions of the inner end of the cylinder 18. The other end 42 of the spring 39 is directed laterally to lie parallel to the axis of the spring and is engaged in one of a plurality of holes 43 in the washer 26. Inasmuch as the washer is held against rotation. The selection of the hole 43 into which the spring end 42 is inserted determines the active tension of the spring.

The spring is so wound as to yieldably tend to turn the sleeve 18 in a counterclockwise direction with respect to Fig. 5; and to limit the rotation of the sleeve 18 by the spring, a pair of stop screws 44 are provided. These screws are threaded in ears 45 extended from the sides of the wall 23 and bent at an angle to the wall 23 so that the screws may lie entirely within the housing. The inner ends of the adjustable stop screws are positioned to abut the loops 35 and thus limit the rotation of the sleeve 18 effected by the spring 39. The opposite rotation of the sleeve 18 brought about by depression of the handle 10, is limited by the engagement of the loops 35 with the edge 46 of the opening 20.

The outer end of the sleeve 18 is projected slightly from the adjacent end of the cylinder 16 and is detachably coupled to the cutter section 19. The coupling of the sections 18 and 19 is effected by the engagement of diametrically opposite dovetailed lugs 47 projected from the cutter section 19, in correspondingly shaped and located recesses 48 in the section 18.

Inasmuch as the external diameter of the sections 18 and 19 is such as to be snugly received within the sections 16 and 17 of the outer member 6, dislodgment of the lugs 47 from the recesses 48 is prevented.

Like the section 17, the cutter section 19 by reason of its readily detachable coupling to the section 18, may be reversed to enable left handed operation of the tool.

From the description thus far, it is apparent that upon depression of the handle 10 toward the housing 5, the inner member 7 will be rotated with respect to the outer member 6 so as to effect the desired cutting action between the knife part 9 and one edge of the stem slot 8.

Inasmuch as all precautions must be taken to avoid bruising the fruit in any way during the picking, the bifurcated end of the outer member 6 is of the novel shape and construction shown. The two arms or branches 49 which define the slot 8, flare outwardly to guide the stem of the fruit into its proper position and have their edges and ends nicely rounded to avoid sharp corners which might bruise the skin of the fruit.

The back of the stationary cutter section 17 is ground away as at 50 (see Fig. 8) so that the edges 51 of the slot 8, at least at their inner extremities, have knife edges. These edges, however, are not exposed where they might injure the fruit.

The knife part 9 of the rotatable cutter section 19, which cooperates with one of the edges 51 to effect the cutting action, in the normal open position of the parts, is aligned with one of the arms 49 to be substantially covered thereby and protected against contact with the fruit.

It is also observed that the outer end of the knife part 9 curves outwardly. This permits the stem slot to be adjusted to a reduced width. The desired adjustment is effected by means of the stop screws 44 which limit the return of the rotatable member 7 by the spring 39. The curved outer end of the knife part 9 enables the stem to be passed smoothly into the slot, and by permitting this adjustment, the manipulation of the tool in picking fruit with small stems is materially facilitated.

By reducing the width of the stem slot, a shorter compression stroke is obtained and in the case of some fruit, as, for instance, tangerines, the narrow slot prevents "clipper cuts", as this fruit is often rather warty and grows with a short neck at its point of attachment to the stem.

In some instances, as where long stemmed fruit is being picked, it may be desirable to provide means for gripping and holding the stem during and after the cutting operation so that grapes and other long stemmed fruit may be picked with but one hand, and where this feature is desired, the construction of the cutting units is modified as illustrated in Figures 9, 10 and 11. In this embodiment, the outer stationary cutter member 52 has two longitudinal slots 53 and 54 extending inwardly from its outer end to form arms 55 and 56. The extremities of the arms are flared outwardly and have their edges rounded to guide the fruit stems into the slots 53 and 54.

The sides of the slot 54 form knife edges with which the knife edge 57 of the inner rotatable member 58 cooperates to effect the cutting action.

Carried by the inner member 58 is a coiled spring 59. The spring 59 is received within the bore of the member 58 and has one end 60 directed backwardly across the outer diameter of the coils to be received in a longitudinal slot 61 in the member 58. The open end of the slot 61 terminates at the shoulder 62 which is formed by cutting the outer end of the member 58 down to provide the knife section, the shoulder 62 being substantially in the same plane as the inner end of the slot 53.

A transverse notch 63 communicates with the slot 61 adjacent its outer end to receive the laterally directed extremity 64 of the spring end 60. Consequently, when the spring is disposed within the member 58 with its end 60 engaged in slot 61 and its extremity 64 engaging in recess 63, the spring 59 will be held assembled with the rotatable member 58.

The opposite end 65 of the spring is directed longitudinally to normally lie adjacent the edge 66 of the slot 53. In this position, the spring end 65 does not interfere with the disposition of the stem in the slots 53 and 54.

However, as the member 58 is rotated to effect the desired cutting action, the spring 59 is also moved so that its end 65 engages the stem and clamps the same between it and the other edge 67 of the slot 53 to hold the same as illustrated in Fig. 11. Because of the resiliency of the spring 59, its end 65 will move a sufficient distance to afford a secure gripping action and thereafter will remain stationary while the member 58 continues its rotation to complete the cutting action. To preclude the stem slipping from between the edge 67 and the spring end 65, the outer end of the edge has a hook 68.

The principle of operation embodying the use of two telescoped members afforded at their outer ends with knife sections, is readily susceptible to different constructions, and in Figs. 12 and 13, another embodiment of the inventive concept is illustrated.

The construction shown in Figs. 12 and 13 embodies outer and inner telescoped members 70 and 71 respectively. The outer ends of these members have cooperating knife elements as in the embodiment shown and described, but the manner of effecting the necessary relative rotation of the two members is altered. In this construction, two diverging compressible handles 72 are provided. These handles are connected to the telescoped members by springs 73. The springs 73 are of special construction and have coiled sections 74 received in the inner ends of the handles which are channel shaped in cross section, and have one end 75 projecting inwardly of the handles to be detachably engaged in pockets 76 formed in a mounting collar 77. The collar 77 is loosely engaged over the outer telescoped member 70.

To hold the handles 72 to the springs, the outer coil of each spring is preferably engaged over and around the handle as illustrated. The outer ends of the springs are continued to lie within the channels of the handles and at a distance from their coiled portions 74 are directed laterally as at 78. At the extremities of the lateral portions 78, the spring ends have knobs 79 which are received in pockets 80 and 81.

The pocket 80 forms part of a driving unit 82 non-rotatably connected to the outer member 70 while the pocket 81 forms part of a driving unit 83 non-rotatably connected to the inner member 71. Like the members 70 and 71, their respective driving units 82 and 83 are telescoped. The driving unit 82 which is outermost is attached to the member 70 and by means of a nut 84 similar to the connection employed in the modification shown in Fig. 1, whereas the inner unit 83 is attached to the inner member 71 by an externally threaded plug 85 threadedly engaged with the unit 83 and the inner member 71.

Inasmuch as the enlargements 79 are permanently engaged in their respective pockets, the handles will be retained assembled with the tubular members although the collar 77 is loose on the outer member 70.

From Fig. 13, it will be apparent that compression of the handle members 72 toward each other causes the telescoped members to rotate and effect the desired cutting action. A screw 86 threaded in the inner telescoped member 71 and operating in a slot 87 in the outer member defines the limits of rotation and retains the telescoped members against relative longitudinal shifting.

From the foregoing description taken in connection with the accompanying drawings, it will be readily apparent to those skilled in the art to which this invention appertains that this invention affords a novel tool for picking oranges and similar fruit, which is of relatively simple, sturdy construction and easily manipulated. It is also apparent that replacement of worn parts which are practically limited to the two hinge pins connecting the handle member with the rotatable inner member, may be readily effected, and that in view of the ready detachability of the knife sections, sharpening and replacement of these elements is an easy matter.

What I claim as my invention is:

1. A readily portable fruit picking tool adapted to be held and operated by one hand, comprising complementary inner and outer telescoped members relatively rotatable about their common axis, the outer member having a bifurcated end with the spaced arms formed thereby flared and rounded to guide a fruit stem into the space between the arms while insuring against possible bruising of the fruit, knife means on the inner member adapted to cooperate with one edge of one of said arms to sever the fruit stem upon relative rotation of said complementary members, and compressible handle means operable to effect rotation of said members.

2. A readily portable fruit picking tool adapted to be held and operated by one hand comprising, a pair of telescoped tubes mounted for relative rotation, the outer tube having a bifurcated end to receive a fruit stem, a cutting blade on the inner tube to cooperate with one edge of the bifurcation to sever the fruit stem upon relative rotation of the tubes, and compressible handle means operable to effect such relative rotation of said tubes.

3. A tool of the character described comprising, a pair of complementary telescoped members relatively rotatable about their common axis, the outer member having a bifurcated end with the spaced arms formed thereby flared and rounded to guide a fruit stem into the space between the arms while insuring against possible bruising of the fruit, knife means on the inner member to cooperate with one edge of one of the arms to sever the fruit stem upon relative rotation of said telescoped members, yieldable means to normally maintain the members in inoperative positions of relative rotation, and compressible handle means operable against the force of the yieldable means to effect relative rotation of said complementary members.

4. In a tool of the character described, a pair of complementary telescoped members relatively rotatable about their common axis, knife edges on said members cooperable in a cutting action upon relative rotation of the members, means to effect relative rotation of said members, and one of said members comprising a knife section and a driving section detachably connected, whereby the knife section is readily removable for replacement and sharpening purposes.

5. In a tool of the character described, a pair of telescoped relatively rotatable members, each of said members comprising, a cutter section and a mounting section, means to readily detachably connect the cutter sections of said members with their respective mounting sections whereby said cutting sections are readily removable, cooperating means on the cutting sections operable upon relative rotation thereof to have a cutting action, and means to effect relative rotation of said mounting sections.

6. A fruit picking tool of the character described comprising, a pair of telescoped relatively rotatable members, each of said members comprising a mounting section and a cutter section, cooperating means on the cutter section operable upon relative rotation thereof to have a cutting action, means to effect relative rotation of the mounting sections, and means to readily detachably connect the cutter sections to their respective mounting sections, including a member telescoped over the juncture of the outer cutter section and its mounting section.

7. A tool of the character described, comprising a pair of telescoped members, the outer member having a bifurcated end with a cutting edge on one of the arms formed thereby, a cutting blade on the inner member operable upon relative rotation of the telescoped members to coact with said cutting edge in a cutting action, a compressible handle to effect relative rotation of said members, and spring means operable in opposition to the compression of the handle to return the handle and said members to their normal positions.

8. In a tool of the character described, a pair of telescoped relatively rotatable members, cooperating means on said members operable upon relative rotation thereof to have a cutting action, a casing surrounding a portion of said telescoped members to afford a handle grip, a compressible member movable into the casing, and means operable upon movement of said compressible member into the casing to effect relative rotation of said telescoped members.

9. In a tool of the character described, a pair of telescoped relatively rotatable members, cooperating means on said members operable upon relative rotation thereof to have a cutting action, a casing surrounding a portion of said telescoped members to afford a handle grip, a compressible member movable into the casing, means operable upon movement of said compressible member into the casing to effect relative rotation of said telescoped members, and a spring within the casing to return said compressible member and the telescoped members to their normal positions.

10. A tool of the character described, comprising a pair of telescoped members, one of which is rotatable about their common axis, cooperating means on said members operable upon rotation of said member to have a cutting action, a casing partially enclosing said telescoped members and affording a grip, a handle depressible toward the side of said casing, and means operable to transmit rotation to said rotatable member upon depression of said handle.

11. A tool for picking fruit and the like adapted to be held and operated by one hand, comprising a tubular housing, a handle depressible sidewise toward the tubular housing said tubular housing and handle being of a size to be gripped in the hand so that closing of the hand depresses said handle, cooperating members mounted in said tubular housing with a portion projecting therefrom, one of said members being movable with respect to the other, means to impart movement to said member upon depression of the handle member, and means on said cooperating members operable upon movement of said one member to afford a cutting action.

12. A tool for picking fruit and the like comprising, a tubular housing, a handle depressible toward the side of the housing, said handle and housing being of a size to be conveniently gripped in one hand in such a manner that closing of the hand effects depression of the handle, a pair of telescoped members mounted from said tubular housing, one of said members being rotatable with respect to the other, means to rotate said member upon depression of the handle, and cutter means carried by said telescoped members and operable upon rotation of the rotatable member to have a cutting action, suitable for severing fruit stems and the like.

13. A tool for picking fruit and the like, comprising a tubular housing, a handle projecting from the side of the housing and having a part depressible thereinto, a tubular element stationary with respect to the housing and having a part projecting from the housing, a rotatable element disposed within the tubular element with a portion positioned within the housing and a part projecting therefrom, means within the housing connecting the depressible handle part and the rotatable element so that depression of the handle effects rotation of said rotatable element, and cutter means at the outer end portions of the rotatable element and stationary tubular element operable to sever fruit stems and the like upon rotation of said rotatable element.

14. In a tool of the character described, a tubular housing, a handle depressible sidewise toward the housing, a tubular extension carried by the housing and having means at its outer end for engagement with a stem to be severed, a rotatable member in said tubular extension having its inner end portion disposed within the housing and means on its outer end portion to cooperate with the stem engaging means of the tubular extension to sever a stem upon rotation of said tubular member, and a link connected to the depressible handle and eccentrically pivoted to the tubular member, whereby depression of said handle rotates the rotatable member.

15. In a tool of the character described, a tubular housing, a handle depressible sidewise toward the housing, a tubular extension carried by the housing and having means at its outer end for engagement with a stem to be severed, a rotatable member in said tubular extension having its inner end portion disposed within the housing and means on its outer end portion to cooperate with the stem engaging means of the tubular extension to sever a stem upon rotation of said tubular member, a link connected to the depressible handle and eccentrically pivoted to the tubular member, whereby depression of said handle rotates the rotatable member, and a spring connected with the rotatable member and the tubular extension to yieldably maintain the same in a predetermined position.

16. In a tool of the character described, a tubular housing, a handle having a part depressible sidewise into the housing, a cylinder positioned in the housing and having an opening in its side in line with the depressible handle part, a wall section carried by the cylinder adjacent said opening and engaging the housing to hold the cylinder assembled therewith, means carried by the cylinder and projecting beyond the housing to engage a stem to be severed, a rotatable member disposed in the cylinder, knife means on the rotatable member cooperable with the stem engaging means of the cylinder to sever a stem upon rotation of said rotatable member, and a link eccentrically pivoted to the rotatable member and projected through the opening in the cylinder for engagement with the depressible handle part, whereby depression of the handle rotates the rotatable member.

17. In a tool of the character described, a tubular housing, a handle having a part depressible sidewise into the housing, a cylinder positioned in the housing and having an opening in its side in line with the depressible handle part, a wall section carried by the cylinder adjacent said opening and engaging the housing to hold the cylinder assembled therewith, means carried by the cylinder and projecting beyond the housing to engage a stem to be severed, a rotatable member disposed in the cylinder, knife means on the rotatable member cooperable with the stem engaging means of the cylinder to sever a stem upon rotation of said rotatable member, a link eccentrically pivoted to the rotatable member and projected through the opening in the cylinder for engagement with the depressible handle part, whereby depression of the handle rotates the rotatable member, a spring having one end connected to the rotatable member and its other end supported from the cylinder to yieldably oppose rotation of the rotatable member and yieldably urge the same to a predetermined position, and means on the wall section carried by the cylinder to define the position of rotation to which the rotatable member is moved by the spring.

18. In a tool of the character described, a housing, a handle having a part depressible sidewise into the housing, said housing and handle being of such size as to enable the same to be held in one hand so that closing of the hand depresses the handle, cooperating cutting members carried by the housing and having means operable to sever fruit stems and the like upon relative movement of said cooperating cutting members, mechanism within the housing to effect relative movement of said cutting members upon depression of the handle, and a removable cover for the housing to enable packing of the housing interior with lubricant.

19. In a tool of the character described, a tubular member comprising a mounting section and a cutting section, the cutting section having means to engage a stem to be cut, and means readily detachably connecting the cutting section and mounting section comprising a lug projecting from one section and engageable in a recess in the other section, and an element telescoped over both sections.

20. In a tool of the character described, a rotatable member comprising, a driving section and a cutting section, said cutting section having a knife, means to drivingly and readily detachably connect said sections comprising, a dovetailed lug projecting from one section and engaging in a correspondingly shaped recess formed in the other section whereby the sections are secured against relative rotation and also against relative axial separation, and an outer sleeve telescoped over the rotatable sections to retain the same connected, said outer sleeve having means cooperating with the knife on the rotatable cutting section to sever fruit stems and the like.

21. A tool of the character described, comprising cooperating telescoped members having means adapted to co-act and sever a fruit stem or the like upon relative rotation of said members, and means to support and actuate said telescoped members comprising, a pair of diverging handles, spring means connecting the inner ends of said handles with the telescoped members and yieldably maintaining them separated, and means carried by the handles and eccentrically connected with the telescoped members to effect relative rotation thereof upon movement of the handles together.

22. A tool of the character described comprising, a pair of telescoped relatively rotatable members, knife means on said members adapted to co-act to afford a cutting action, a pair of spaced handles, spring means to mount each handle from the telescoped members and yieldably maintain the handles apart, and extensions on said spring means each eccentrically connected with one of said telescoped members whereby compression of the handles effects relative rotation of said members.

23. In a tool of the character described including relatively rotatable telescoped cutting members, cooperating means on said members operable upon relative rotation thereof to sever fruit stems and the like, and means carried by one of said members to engage a fruit stem to be severed between the fruit and the place of severance, and to yieldably hold the same during and after the cutting thereof.

24. In a tool of the character described including a pair of telescoped relatively rotatable members, one of said members having a slot engageable with a fruit stem or the like to be severed, a knife on the other member cooperable with one edge of the slot to sever the stem, and a holding member movable with said member having the knife to clamp the stem between it and a part of said first mentioned member to hold the stem during and after the cutting thereof.

25. In a tool for picking fruit, a pair of complementary telescoped members relatively rotatable about their common axis, one of said members having a bifurcated end, the arms of which each have a cutting edge and a non-cutting edge and being so located with respect to each other that the cutting edges which are adjacent lie closer together than the non-cutting edges so as to preclude contact of the fruit stem with the non-cutting edges and also afford a space through which the cutting edges are visible when the tool is in use, and said arms being so shaped as to enable engagement of the cutting edges of the bifurcated end with the stem of the fruit directly adjacent the fruit without danger of bruising the same, a cutting blade on the other of said telescoped members normally covered by one of said arms and operable upon relative rotation of said members to coact with one of the cutting edges of the bifurcated end in a cutting action, and means to effect relative rotation of said members.

LAURANCE H. BOTTS.